United States Patent
Golecki

(12) 
(10) Patent No.: US 6,896,968 B2
(45) Date of Patent: May 24, 2005

(54) COATINGS AND METHOD FOR PROTECTING CARBON-CONTAINING COMPONENTS FROM OXIDATION

(75) Inventor: Ilan Golecki, Parsippany, NJ (US)

(73) Assignee: Honeywell International Inc., Morristown, NJ (US)

( * ) Notice: Subject to any disclaimer, the term of this patent is extended or adjusted under 35 U.S.C. 154(b) by 203 days.

(21) Appl. No.: 09/828,048

(22) Filed: Apr. 6, 2001

(65) Prior Publication Data

US 2003/0215625 A1 Nov. 20, 2003

(51) Int. Cl.[7] ................................................ B32B 9/00
(52) U.S. Cl. ...................... 428/446; 428/293; 428/367; 428/368; 106/287.13; 106/287.16; 427/249.16; 427/255.24; 427/255.27; 501/87; 501/88; 501/95.2; 501/99
(58) Field of Search ................................ 428/293, 367, 428/368, 446; 427/249.16, 255.24, 255.27; 501/87, 88, 95.2, 99; 106/287.13, 287.16

(56) References Cited

U.S. PATENT DOCUMENTS

| | | | | |
|---|---|---|---|---|
| 4,515,860 A | * | 5/1985 | Holzl | 428/408 |
| 4,671,997 A | * | 6/1987 | Galasso et al. | 428/408 |
| 4,673,551 A | * | 6/1987 | Sugiyama et al. | 420/535 |
| 4,737,379 A | * | 4/1988 | Hudgens et al. | 427/575 |
| 5,166,001 A | * | 11/1992 | Niebylski | 428/446 |
| 5,209,979 A | * | 5/1993 | Moehle et al. | 428/408 |
| 5,225,283 A | * | 7/1993 | Leung et al. | 428/408 |
| 5,258,224 A | * | 11/1993 | Langlois et al. | 428/325 |
| 5,462,800 A | * | 10/1995 | Yamazaki et al. | 428/408 |
| 5,462,899 A | | 10/1995 | Ikeda | |
| 5,527,629 A | | 6/1996 | Gastiger et al. | |
| 5,616,369 A | | 4/1997 | Williams et al. | |
| 5,670,224 A | | 9/1997 | Izu et al. | |
| 5,807,614 A | | 9/1998 | Sindzingre et al. | |
| 5,807,615 A | | 9/1998 | Sindzingre et al. | |
| 6,159,871 A | * | 12/2000 | Loboda et al. | 438/786 |
| 6,287,990 B1 | * | 9/2001 | Cheung et al. | 438/780 |
| 6,329,261 B1 | * | 12/2001 | Kishimoto | 438/359 |
| 6,340,435 B1 | * | 1/2002 | Bjorkman et al. | 216/72 |
| 6,376,392 B1 | * | 4/2002 | Lee et al. | 438/778 |
| 6,410,462 B1 | * | 6/2002 | Yang et al. | 438/788 |
| 6,498,112 B1 | * | 12/2002 | Martin et al. | 438/763 |
| 6,756,121 B2 | * | 6/2004 | Forsythe et al. | 428/408 |

* cited by examiner

Primary Examiner—David Brunsman
(74) Attorney, Agent, or Firm—Oval Caglar, Esq.

(57) ABSTRACT

A protective coating for a carbon-containing component comprises a material selected from the group consisting of non-stoichiometric silicon and carbon; non-stoichiometric silicon and oxygen; non-stoichiometric silicon and nitrogen; compounds of silicon, oxygen, and carbon; compounds of silicon, oxygen and nitrogen; compounds of silicon, nitrogen, and carbon; and silicon.

10 Claims, No Drawings

COATINGS AND METHOD FOR PROTECTING CARBON-CONTAINING COMPONENTS FROM OXIDATION

BACKGROUND

The present invention relates to components containing elemental carbon, including components containing graphite, amorphous carbon and carbon fibers, and components containing Carbon-Carbon (hereinafter "C—C") composites.

C—C composites possess a combination of high strength, high fracture toughness, low density, very high thermal conductivity and high electrical conductivity. The mechanical strength of C—C composites increases as operating temperature increases, in sharp contrast to most other materials, including metals, metallic alloys and ceramics, which become softer and weaker as the operating temperature increases. This combination of attributes makes C—C composites good candidates for high temperature applications such as aerospace heat exchangers and aircraft brake pads.

However, the carbon in the C—C components tends to oxidize when exposed to air or other oxidizing environments at temperatures exceeding approximately 300° C. When the carbon is oxidized, it loses mass. This loss in mass directly leads to loss of mechanical strength of the component, as well as loss of integrity, functionality and ultimately failure of the component.

Barrier coatings such as SiC and $SiO_2$ (silica glass) may be applied to the components in order to protect the carbon from oxidizing when subjected to sustained or repeated high temperatures. Both SiC and $SiO_2$ prevent and/or retard oxidation when free of microcracks and other defects because the oxidizing species must diffuse or filter through these coating materials to reach the underlying surface of the C—C component. Such diffusion is negligibly slow at temperatures below about 800° C., for both dry oxygen and steam oxidants. Also, the chemical reaction of SiC with oxygen to produce $SiO_2$ is negligibly slow below about 800° C.

$SiO_2$ has a much lower mechanical strength than that of SiC, leading in principle to earlier failure of the $SiO_2$ coating when the temperature is below its softening temperature (about 1150° C.). $SiO_2$ has lower density (2.2 $g/cm^3$) than SiC (3.2 $g/cm^3$).

Barrier materials such as SiC, for example, when applied to C—C and other carbon-containing components, do not afford complete protection against oxidation due primarily to the difference in thermal expansion coefficients (TCEs) between the specific coating material and the carbon-containing component. Such barrier coatings are usually applied at a relatively high temperature from vapor-phase or liquid-phase precursors. After application of the coating material, the coated component cools down to room temperature. Due to the difference in TCEs between the coating material and the carbon-containing component, high stresses develop in the coating, which lead to microcracks throughout the coating. Many of these microcracks in the coating reach through the thickness of the coating to the coating-carbon interface. Some microcracks may also develop in the underlying carbon-containing component. During subsequent exposure to an oxidizing ambient at a temperature higher than 300° C., oxidants may penetrate through such microcracks into the underlying carbon-containing component and undesirably oxidize the carbon therein. In addition, during repeated thermal cycles experienced by the coated component throughout its useful lifetime, additional microcracks may develop in the coating, as well as in the underlying carbon-containing component.

Further, the density of microcracks usually increases with the difference in TCEs between the two materials and with the coating application temperature, due to the corresponding increase in the stress generated in the coating.

Protecting carbon-containing components from oxidation is particularly troublesome when the component is very thin, for example when the thickness is 3 to 60 mils (0.07–1.5 mm), and/or when the component has a complex shape. For example, very thin-gauge and/or complex-shaped carbon-containing components are used in C—C heat exchangers for operation in the temperature range of approximately 25 to 800° C. for total times of about 8,000 to 20,000 hours. Such a component may not be allowed to lose more than a small fraction of its original weight, for example about 1% to 5% of the weight, without measurable and/or serious degradation in its functional properties, such as mechanical strength (in contrast, a relatively thick, for example, 1 inch or 25 mm thick, C—C component used as a disk brake pad in an airplane or as part of a missile may lose 10 to 30 percent of its initial weight without failing its functional mission).

SUMMARY

A protective coating for a carbon-containing component comprises a material selected from the group consisting of non-stoichiometric silicon and carbon; non-stoichiometric silicon and oxygen; non-stoichiometric silicon and nitrogen; compounds of silicon, oxygen, and carbon; compounds of silicon, oxygen and nitrogen; compounds of silicon, nitrogen, and carbon; and silicon.

DETAILED DESCRIPTION

A protective coating for a carbon-containing component is made of a material selected from the group consisting of silicon (Si); silicon oxide ($SiO_x$); silicon carbide ($SiC_y$); silicon oxycarbide ($SiO_xC_y$); silicon nitride ($SiN_z$); silicon oxynitride ($SiO_xN_z$); silicon carbonitride ($SiC_yN_z$); silicon oxycarbonitride ($SiO_xC_yN_z$); non-stoichiometric compounds of silicon and carbon; non-stoichiometric compounds of silicon and nitrogen; and non-stoichiometric compounds of silicon and oxygen (thus, stoichiometric SiC, $Si_3N_4$ and $SiO_2$ are excluded). At least one of x, y, and z is greater than zero; and $x<2$, $y<1$ and $z<4/3$. All such compositions possess lower coefficients of thermal expansion relative to SiC and have mechanical and thermal properties better than $SiO_2$ below about 800° C.

The coating may include a single layer of fixed composition or it may have multiple layers. If the coating has multiple layers, not all layers are restricted to $x<2$, $y<1$ and $z<4/3$. Thus, the material of at least one layer is selected from the group just described, and one or more of the remaining layers may include stoichiometric compounds of silicon and carbon, stoichiometric compounds of silicon and oxygen, and stoichiometric compounds of silicon and nitrogen.

The composition of the carbon-containing component may include, without limitation, graphite, amorphous carbon and carbon fibers, and components made from C—C composites. The coating may be applied to a component having any shape, including a shape such as a manifold or a corrugated fin or pin fin of a plate-fin heat exchanger.

Such compounds of the group prevent and/or retard oxidation when free of microcracks and other defects because the oxidizing species must diffuse or filter through these coating materials to reach the underlying surface of the carbon-containing component. Such diffusion is negligibly slow at temperatures below about 800° C., for both dry oxygen and steam oxidants. Furthermore, in the case of these carbon-containing coating materials SiCy, SiOxCy, SiCyNz and SiOxCyNz, the carbon is chemically bound and not in the free elemental state, and thus no oxidizing chemical reaction with the carbon in these coatings takes place below about 800° C.

Si, $SiO_xC_y$ and the other compounds in the group possess mechanical, thermal and chemical properties intermediate between those of (stoichiometric) $SiO_2$ and SiC and are therefore appropriate for use as coatings on carbon-containing components, specifically C—C components. For example, the TCE and the mechanical strength of Si and $SiO_xC_y$ are lower than those of SiC and higher than those of $SiO_2$. Thus, the density of microcracks in such Si and $SiO_xC_y$ materials when applied onto C—C components should in principle be lower compared to microcrack densities in higher TCE coating materials. Si and the other Si compounds of the group have higher thermal conductivities than that of $SiO_2$. The higher thermal conductivity is desirable in applications such as heat exchangers.

These coatings may be applied by various techniques, including chemical vapor deposition (CVD) and chemical vapor infiltration (CVI). The CVD and CVI may be applied over a wide pressure range, including, for example, without limitation, pressures from $1 \times 10^{-3}$ to 760 Torr (1 atmosphere). Sub-atmospheric pressure CVD is a preferred exemplary approach. Both thermally activated and plasma-enhanced CVD techniques may be used at various stages of the coating application process. The application process can be practiced in a variety of types of reactors.

Appropriate chemical precursors may be applied onto and into C—C components and specifically thin-gauge C—C components, through the vapor phase, in order to produce solid coatings that prevent and retard the incursion of oxidizing species into the C—C components, especially in the operating range of about 25–800° C.

Silicon and silicon oxycarbide type coatings may be deposited on thin-gauge complex shaped components by either chemical vapor deposition or plasma-enhanced chemical vapor deposition (PECVD). Either process can be used to deposit and infiltrate the Si and $SiO_xC_y$ coatings onto and into C—C composites and other carbon-containing components. Such coatings can be deposited using chemical precursors such as silane ($SiH_4$) and hydrogen for Si, and chemical precursors such as methylsilane ($SiCH_3H_3$) and nitrous oxide ($N_2O$) for $SiO_xC_y$ or $SiO_xC_yN_z$ as well as using other chemical precursors. Additionally, the deposition temperatures of Si and $SiO_xC_y$ are significantly lower by hundreds of degrees Centigrade than the deposition temperatures of SiC coatings. Thus, the lower deposition temperatures result, in principle, in lower TCE-mismatch-induced stress in these coatings and therefore in lower microcrack densities. Lower deposition temperatures are also desirable in minimizing process induced microcracks and defects in the carbon-containing components being coated. Lower deposition temperatures are also desirable in order to lower the cost of processing, in terms of the capital cost of furnaces and reactors, the cost of supplies and fixturing and the cost of electricity and cooling. Lower deposition temperatures are also advantageous in terms of shortening the processing time, since reactor heat up and cool down times are thereby shortened.

Graded composition coatings may be applied to the carbon-containing component. For example the x of $SiO_x$ can vary either continuously or in steps with distance from the surface of the carbon-containing component from x=0 to x=2. An advantage of using such graded composition coatings is the ability to achieve better adherence of the coating to the carbon-containing component, while minimizing thermal mismatches and improving mechanical strength and resistance to cracks that may arise during thermal cycling. Such compositionally graded coatings may be applied in a way wherein the composition varies in steps with depth or with thickness, e.g., from $SiO_2$ to SiO to Si. Such coatings may also be applied wherein the composition varies continuously with depth. Instead, the intermediate composition coatings (e.g., SiO or $SiO_{1.5}$) may comprise a complex multi-phase mixture of materials. For example, Si nanocrystals and $SiO_2$ nuclei or regions may be present in the correct chemical proportion. Other compositionally graded coatings may be used. For example, compositionally graded $SiO_x$—$SiC_y$ coatings, $SiO_x$—$SiN_z$ coatings, Si—$SiO_x$—$SiC_y$ or Si—$SiO_x$—$SiC_y$—$SiN_z$ may be used. Different compositions and microstructures may be obtained by using different combinations of chemical precursors, different deposition temperatures and the like. Complex ternary and multinary mixtures of elements and compounds which include the Si-based and related compositions of the group may be used. Layered compounds, for example, $Si/SiO_2/SiO_xC_y/Si/SiO_2/SiO_xC_y$ etc., may also be used Physical properties of aforementioned Si-based compounds may be design-tailored by varying the composition (for example x:y ratio in $SiO_xC_y$). In turn, the composition can be controlled by controlling the CVD process conditions, for example, the flow rates and partial pressures of the precursors, the temperature of the carbon-containing components and the plasma power and frequency. The desired properties of the coating may be tailored to the temperature range over which said coating protects the composite component from destructive oxidation. Likewise, the thickness and number of coatings applied to component will depend on the method of applying the coating and the intended use for the component.

The CVD method can be scaled up to multiple components which may each be several feet in dimension. Detailed design of the CVD reactor may be modified to accommodate a plurality of components of different sizes and shapes. In addition, the chemical vapor deposition process allows for efficient conformal coating and infiltration onto/into complex-shaped parts and excellent control of coating thickness.

While the CVD of some of the above-noted coating compositions may take place in an oxidizing ambient, the component temperature and other process conditions are properly adjusted such that, at most, only negligible oxidation of the carbon in the components occurs during the coating process. The surface of the carbon-containing component is rapidly covered with such coating at the beginning of the CVD process before any measurable oxidation of the carbon in the component takes place. In the alternative, the process can be started in a non-oxidizing ambient environment, and a thin coating that does not contain oxygen can be deposited first on the component.

Exemplary Embodiment

The following is an example of the deposition of $SiO_xC_y$, onto a C—C composite coupon. Several dense single-ply pitch-fiber-based two-dimensional woven C—C coupons, each having dimensions of about 0.5×4×0.015 inch (about 12.5×100×0.4 mm) were coated with a single layer of $SiO_xC_y$ coating using low-pressure CVD in a hot-wall, 19 mm inside diameter, tubular reactor equipped with a number of mass flow controlled gas lines and a throttle valve to control the total pressure during the run. Additional components, including other carbon-containing and C—C components and single-crystalline (100) oriented single-side-polished silicon pieces, were also coated simultaneously. The precursors used were methylsilane at 4 sccm and nitrous oxide at 25 sccm. The total pressure in the reactor was 2 Torr and the deposition temperature was 800° C. Prior to being loaded into the reactor, the dimensions of the C—C coupons were measured using a digital caliper and a micrometer. The coupons were degreased ultrasonically using, in sequence, methylene chloride, acetone and isopropanol; the coupons were then dried in air on a hot plate. After the coupons cooled to room temperature, each coupon was weighed on an analytical balance. The coupons were held statically close together within the reactor so as to (a) simulate a high-fin-density heat exchanger core and (b) minimize the area of each coupon which touched any other items, in order to ensure uniform coating. The reactor was evacuated to a pressure of about 0.01 Torr and backfilled with high purity argon; this evacuation and backfill sequence was repeated several times to eliminate residual gas-phase impurities. The reactor was also verified to be helium leak tight. The C—C and other carbon-containing components were then heated either in vacuum or in flowing inert gas at about 200° C. so as to remove residual water vapor and other air molecules from the components and the reactor walls. The components were then optionally additionally cleaned in-situ within the reactor using either an electric discharge of an inert or a reactive gas and/or by exposing the components to appropriate gas flow at a temperature between room temperature and the deposition temperature. Next, the reactor temperature was set to the deposition temperature and after the temperature stabilized, flows of methylsilane and nitrous oxide were started. At the end of the run, the flows of these precursors were stopped, and the reactor was evacuated and backfilled with inert gas several times and allowed to cool to room temperature.

The composition and thickness of $SiO_xC_y$ coatings produced in the manner described above could be varied by varying the CVD deposition conditions. Thin coatings were transparent while thicker coatings were opaque in the visible spectrum. Infrared (IR) measurements in the 200–4000 cm$^{-1}$ range demonstrated that the carbon in such coatings was truly chemically bound in the compound, rather than being in the undesirable free elemental state: three major IR peaks were measured on coatings deposited on Si components: an 800 cm$^{-1}$ SiC peak (demonstrating the presence of Si—C bonds in the coatings) and 450 and 1050 cm$^{-1}$ $SiO_2$ peaks (demonstrating the presence of Si—O bonds in the coatings). If the carbon were mostly present in the undesired elemental form in a silica matrix, the 800 cm$^{-1}$ SiC peak would not be present or would not be prominent. Rutherford backscattering spectrometry (RBS) and Auger electron spectroscopy (AES) measurements indicated that compositions in the range y=0.15 to 0.80 could be obtained readily. This wide composition range corresponds to coatings which are close to $SiO_2$ in composition (low y value) all the way to coatings which are close to SiC in composition (high y value). Coating thicknesses obtained in several hours of deposition were in the range of 1–100 micrometer, depending on deposition conditions. Thus relatively high deposition rates were demonstrated.

Although the present invention has been described above with reference to specific embodiments, it is not so limited. Instead, the present invention is construed according to the claims that follow.

What is claimed is:

1. A carbon-containing component comprising a protective coating, wherein the carbon-containing component is selected from the group consisting of graphite, amorphous carbon, carbon fibers and carbon-carbon composites; and
   wherein the protective coating comprises a material selected from the group consisting of:
   silicon oxycarbide ($SiO_xC_y$);
   silicon oxynitride ($SiO_xN_z$);
   silicon carbonitride ($SiC_yN_z$); and
   silicon oxycarbonitride ($SiO_xC_yN_z$);
   wherein x<2, y<1 and z<4/3, and at least two of x, y, and z are greater than zero in each of said materials;
   wherein the carbon (C) in the protective coating is chemically bound, and
   wherein the protective coating is deposited by means of chemical vapor deposition using methylsilane and nitrous oxide.

2. The carbon-containing component of claim 1, wherein said protective coating has a coefficient of thermal expansion which is less than the coefficient of thermal expansion of silicon carbide (SiC).

3. The carbon-containing component of claim 1, wherein carbon-containing component comprises a plate-fin heat exchanger.

4. The carbon-containing component of claim 1 wherein said protective coating has a graded composition through its thickness.

5. A carbon-containing component comprising a protective coating, wherein the carbon-containing component is selected from the group consisting of graphite, amorphous carbon, carbon fibers and carbon-carbon composites; and
   wherein said protective coating includes at least a first layer and a second layer, said first layer comprises at least one material selected from the group consisting of:
   non-stoichiometric compounds of silicon and carbon;
   non-stoichiometric compounds of silicon and oxygen;
   non-stoichiometric compounds of silicon and nitrogen;
   compounds of silicon, oxygen, and carbon;
   compounds of silicon, oxygen, and nitrogen;
   compounds of silicon, nitrogen, and carbon;
   compounds of silicon, oxygen, nitrogen, and carbon; and
   silicon; and
   wherein said second layer comprises at least one material selected from the group consisting of:
   silicon oxycarbide ($SiO_xC_y$);
   silicon oxynitride ($SiO_xN_z$);
   silicon carbonitride ($SiC_yN_z$); and
   silicon oxycarbonitride ($SiO_xC_yN_z$);
   wherein x<2, y<1 and z<4/3, and at least two of x, y, and z are greater than zero in each of said materials,
   wherein the carbon (C) in the protective coating is chemically bound, and
   wherein the protective coating is deposited by means of chemical vapor deposition using methylsilane and nitrous oxide.

6. The carbon-containing component of claim 5, wherein each of said first and second layers comprises a compound selected from the group consisting of silicon oxycarbide ($SiO_xC_y$); silicon carbonitride ($SiC_yN_z$); and silicon oxycarbonitride ($SiO_xC_yN_z$), wherein x<2, y<1 and z<4/3, and at least two of x, y, and z are greater than zero in each of said compounds.

7. The carbon-containing component of claim 6, wherein the carbon (C) in said compound of said first and second layers is chemically bound.

8. The carbon-containing component of claim 5, wherein said carbon-containing component comprises a plate-fin heat exchanger.

9. The carbon-containing component of claim 5, wherein said protective coating is applied directly to a surface of said carbon-containing component.

10. The carbon-containing component of claim 5, wherein said protective coating has a coefficient of thermal expansion which is less than the coefficient of thermal expansion of silicon carbide (SiC).

* * * * *